(12) United States Patent
Ou et al.

(10) Patent No.: US 11,488,037 B2
(45) Date of Patent: Nov. 1, 2022

(54) NOTIFICATION PRIORITIZATION BASED ON USER RESPONSES

(71) Applicant: Citrix Systems, Inc., Burlington, MA (US)

(72) Inventors: Yuran Ou, Nanjing (CN); Xiaolu Chu, Nanjing (CN); Sai Xu, Nanjing (CN)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 400 days.

(21) Appl. No.: 16/818,906

(22) Filed: Mar. 13, 2020

(65) Prior Publication Data

US 2021/0201175 A1 Jul. 1, 2021

Related U.S. Application Data

(63) Continuation of application No. PCT/CN2019/128279, filed on Dec. 25, 2019.

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ............ G06N 5/04; G06N 20/00; G06N 3/08; G06N 5/003
See application file for complete search history.

(56) References Cited

U.S. PATENT DOCUMENTS

| | | | |
|---|---|---|---|
| 10,621,250 B2 * | 4/2020 | Taboriskiy | G06Q 50/01 |
| 11,093,306 B1 * | 8/2021 | Libin | H04L 67/54 |
| 2012/0323933 A1 * | 12/2012 | He | H04L 51/224 |
| | | | 707/E17.005 |
| 2013/0031190 A1 * | 1/2013 | Chan | H04L 67/535 |
| | | | 709/206 |
| 2016/0072907 A1 * | 3/2016 | Papakipos | H04W 4/023 |
| | | | 709/217 |
| 2016/0350812 A1 * | 12/2016 | Priness | G06Q 30/0269 |
| 2017/0302609 A1 * | 10/2017 | Vardhan | H04L 51/224 |
| 2018/0107743 A1 * | 4/2018 | Taboriskiy | G06Q 50/01 |
| 2018/0137445 A1 * | 5/2018 | Tijerina | G06Q 10/06313 |
| 2019/0334851 A1 * | 10/2019 | Shi | H04L 67/306 |
| 2019/0394289 A1 * | 12/2019 | Lehrian | H04L 67/306 |
| 2020/0334693 A1 * | 10/2020 | Chan | H04L 67/535 |
| 2021/0081459 A1 * | 3/2021 | Chung | H04L 51/224 |
| 2021/0303684 A1 * | 9/2021 | Makhlevich | G06F 16/24578 |
| 2022/0068278 A1 * | 3/2022 | York | G06F 3/167 |

* cited by examiner

*Primary Examiner* — J. Brant Murphy
(74) *Attorney, Agent, or Firm* — Mintz Levin Cohn Ferris Glovsky and Popeo, P.C.

(57) ABSTRACT

Methods and systems are described for prioritizing notifications based on user responses. The system may include determining a first score indicative of a first relevance of a notification to a first user at a first client device. The first score is determined based on at least metadata characterizing the notification. The notification is prioritized for the first user based on at least the first score. The notification is presented at the first client device based on at least the prioritization for the first user. A second score is determined that is indicative of a second relevance of the notification to a second user at a second client device. The second score is determined based on at least a response to the notification from the first client device.

19 Claims, 9 Drawing Sheets

400

402

Determining, for a notification, a first score indicative of a first relevance of the notification to a first user at a first client device, the first score determined based on at least metadata characterizing the notification

404

Prioritizing the notification for the first user based on at least the first score

406

Presenting, based on at least the prioritization for the first user, the notification at the first client device

408

Determining, for the notification, a second score indicative of a second relevance of the notification to a second user at a second client device, the second score determined based on at least a response to the notification from the first client device

FIG. 4

NOTIFICATION PRIORITIZATION BASED ON USER RESPONSES

CROSS REFERENCE TO RELATED APPLICATIONS

This application is a continuation application of International Application No. PCT/CN2019/128279, filed Dec. 25, 2019 and entitled "NOTIFICATION PRIORITIZATION BASED ON USER RESPONSES," the contents of which are hereby incorporated by reference in their entirety.

TECHNICAL FIELD

The subject matter described herein relates generally prioritizing application content.

BACKGROUND

Computer and mobile devices are often configured with various applications. Some applications require user interaction to perform actions and fulfill requests. The applications may compete for user attention by generating messages, such as notifications. Prioritizing and responding to notifications from the various applications is tedious, time-consuming, and potentially insecure.

SUMMARY

Systems, methods, and articles of manufacture, including computer program products, are provided for prioritizing notifications based on user responses.

In some example embodiments, there is provided a system including at least one data processor and at least one memory storing instructions which, when executed by the at least one data processor, result in operations including determining, for a notification, a first score indicative of a first relevance of the notification to a first user at a first client device, the first score determined based on at least metadata characterizing the notification; prioritizing the notification for the first user based on at least the first score; presenting, based on at least the prioritization for the first user, the notification at the first client device; and determining, for the notification, a second score indicative of a second relevance of the notification to a second user at a second client device, the second score determined based on at least a response to the notification from the first client device.

In some variations, one or more of the features disclosed herein include the following features can optionally be included in any feasible combination. The notification for the second user may be prioritized based on at least the second score. Based on at least the prioritization for the second user, the notification may be presented at the second client device. The first user may be associated with a first user group, and the second user may be associated with a second user group. The determining the second score may be based on at least a machine learning model. The machine learning model may be trained in response to receiving the response to the notification. The second score may be a value generated by the machine learning model. The machine learning model may be further trained based on at least the metadata characterizing the notification. The metadata may characterize the first user, and the metadata may characterize the second user, rather than data content of the notification. The machine learning model may be a weighted scoring model, a heuristic model, linear regression, decision tree, logistic regression, and/or a neural network. The second score may be determined based on at least the metadata characterizing the notification and at least metadata characterizing the second user. The metadata characterizing the notification may include an urgency indicator of the notification, a source of the notification, a time of the notification, a title of the notification, a purpose of the notification, and/or an indication in the notification that the response is required. The metadata characterizing the first user may include a quantity of received notifications over time, a user availability, peer activity, a role, an organization, user activity, and/or a quantity of sent notifications over time.

Implementations of the current subject matter can include, but are not limited to, methods consistent with the descriptions provided herein as well as articles that comprise a tangibly embodied machine-readable medium operable to cause one or more machines (e.g., computers and/or the like) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts a process flow for presenting application content, in accordance with some example embodiments;

When practical, similar reference numbers denote similar structures, features, or elements.

DETAILED DESCRIPTION

Figure 1:
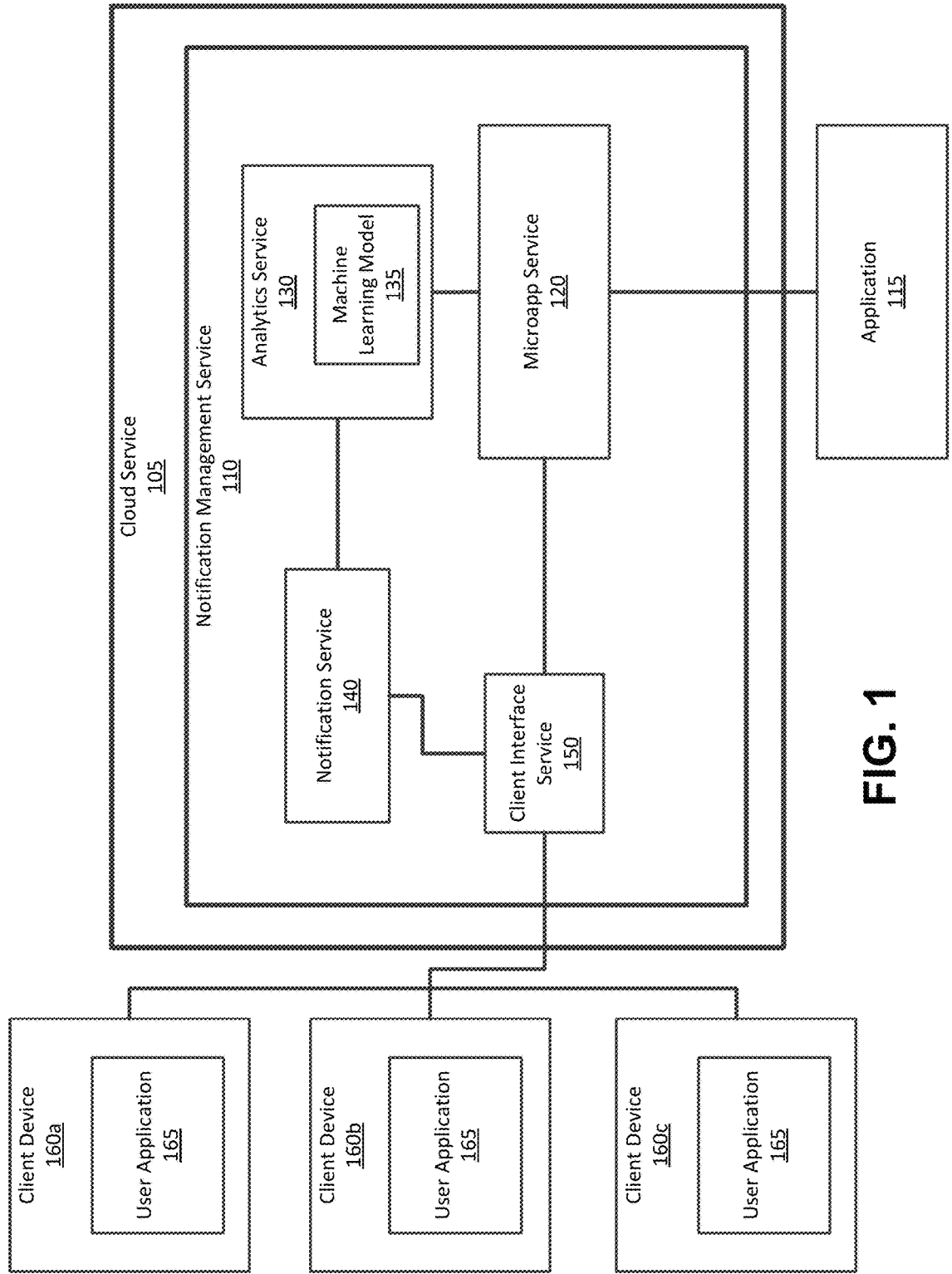
FIG. 1 depicts a block diagram illustrating an example of a notification management system, in accordance with some example embodiments.

Applicants may send messages, such as notifications, to a user interface being viewed by a user. As the number of applications increases, these applications and their corresponding notification messages may compete for the user attention.

As used herein, a notification refers to a message, such as an email, an SMS, an alert, a chat, a link, a social media post, and/or any other type message. The notification may convey information. In some instances, the notification may require an action by the user. Examples of the actions include viewing the notification, responding to the notification, deleting the notification, or any other type of action. The notification may be addressed to a specific recipient or sent (e.g., broadcasted) more generally to a group of users. To illustrate further, an application may generate notifications including information regarding an earnings call. The earnings call notification may be difficult to prioritize relative to other notifications because its contents may be encrypted or otherwise inaccessible.

To overcome this problem, a notification service may be provided. The notification service may prioritize notifications based on a relevance of the notification (e.g., a "notification relevance"). The notification relevance may be based on presenting the notification to a first client device and receiving a user response to the notification from the first client device. A user response to the notification may increase the relevance of the notification and may include viewing, opening, responding, sharing, or saving the notification. For example, the earnings call notification may be presented to a computing device associated with a first employee. The first employee may open the notification and click on a provided link. Clicking the link may constitute a user response. Based on the response from the first employee (and/or others), the notification service may increase the relevance of the notification (e.g., the earnings call notification).

If the notification relevance satisfies a threshold, the notification may be presented to a second client device or a group of people. For example, a threshold may include having at least three user responses. User responses include viewing, opening, responding, sharing, or saving a notification. A second employee and a third employee may open the earnings call notification and click on the provided link. The threshold is satisfied based on the three users responding to the earnings call notification. Based on satisfying the threshold, the notification service may increase the relevance of the earnings call notification to a second group of users. The second group of users may be more numerous than the first person(s) who first received the notification.

Notifications with a higher relevance may be presented first or prioritized over notifications with lower relevance. For example, the earnings call notification may be prioritized over the classified ad notification based on the classified ad notification receiving fewer user responses from the first employee, the second employee, and the third employee.

If no user responses are available for a given type of notification, the notification relevance may be based on notification metadata or user metadata. For example, the earnings call notification and the classified ad notification might not have any user responses. The notification management service may determine the earnings call notification has a higher relevance based on notification metadata (e.g., the source of the earnings call notification is the financial application) and user metadata (e.g., the receiving client device is associated with an accountant). Accordingly, the notification management service prioritizes the presentation of the notifications based on user responses, notification metadata, and/or user metadata.

FIG. 1 depicts a block diagram of a notification management system 100, in accordance with some example embodiments. The system 100 includes a cloud service 105, which further includes a notification management service 110, an application 115, and a first client device 160*a*, a second client device 160*b*, and a third client device 160*c*.

The notification management service 110 may further include a microapp service 120, an analytics service 130, a notification service 140, and a client interface service 150. The microapp service 120 may be communicatively coupled to the application 115, the analytics service 130, and the client interface service 150. The analytics service 130 may be communicatively coupled to the notification service 140. The notification service 140 may be communicatively coupled to the client interface service 150. The client interface service may be communicatively coupled to the first client device 160*a*, the second client device 160*b*, and the third client device 160*c*. The first client device 160*a*, the second client device 160*b*, and the third client device 160*c* may include instances of the user application 165.

The cloud service 105 may comprise, or be comprised in, a datacenter available to users over the internet. The cloud service 105 may enable accessibility to services, such as software as a service (SaaS), infrastructure as a service, platform as a service, and the like. The cloud service 105 may service a single organization or may service a variety of organizations. In the cloud service 105, multiple tenants may share a pool of physical, computing hardware including computer networks, servers, storage devices, and/or the like. The cloud service 105 may have a multi-cloud architecture in which the pool of computing hardware are hosted by several cloud service providers. Furthermore, the cloud service 105 may be a hybrid cloud service that includes a mix of private cloud providers and public cloud providers. The cloud service may screen users, maintain firewalls, detect intrusions, or gather data. Examples of a cloud service include Microsoft Azure Cloud, Amazon Web Services, Google Cloud, or IBM Cloud.

The notification management service 110 is configured to receive notifications from application 115. A notification includes a message providing information, and, in some cases, a request for a user response. For example, a notification may be an email, a link, a web page, a newsletter, a report, a chat, a social media post, an application message, and a comment. Other notifications may include a photo, an audio message, a phone message, a video, a text message, and a voicemail. Notifications may be broadcasted a large group of people or they may be privately sent and received. The notification management service 110 prioritizes, deprioritizes, or discards the notifications from the application 115. If a notification is not discarded, the notification may be presented to at least one client device. The notification management service 110 may prioritize notifications based on responses from client devices, such as the first client device 160a, the second client device 160b, and the third client device 160c, and so forth. The notification management service may prioritize notifications based on a notification metadata and/or a user metadata. Notification metadata may include a source of the notification and a time of the notification. User metadata may include a user availability (e.g., user is on vacation), a peer activity (e.g., user is in financial department), and a user role (e.g., user is on a head accountant). The notification management service 110 may support protocols, such as REST API, JSON, OData-JSON, and 6ML.

The notification management service 110 may provide users the ability to search for relevant information across files and applications via a user application 165. The user application 165 refers to an application that presents the notifications to the user. A simple keyword search may, for example, be used to find application resources, SaaS applications, desktops, and files via the user application 165. This functionality may enhance user productivity and efficiency as application and data sprawl is prevalent across all organizations.

The notification management service 110 may enable virtual assistance functionality that allows users to remain productive and take quick actions. Users may, for example, interact with the "virtual assistant" and ask questions such as "What is Bob Smith's phone number?" or "What absences are pending my approval?" via the user application 165. The notification management service 110 may, for example, parse these requests and respond because they are integrated with the application 115. Users may be able to interact with the virtual assistant through either the user application 165 or directly from another service.

The application 115 may include one or more applications and/or other services (sometimes referred to as systems of record) from which content may be obtained and presented to a client device, such as client devices 160a-c. The notification management service 110 may consolidate information generated by the application 115 using the microapp service 120. The application 115 may include a SaaS application, web application, Windows application, Linux application, a virtual desktop, a file repository, and/or a file sharing system. The application 115 may be a SaaS application, a legacy application, or a homegrown application, and may be hosted on-premises or within the cloud service 105.

The microapp service 120 may be made available to users to streamline functionality from various applications, such as those found in the application 115. Microapp service 120 may, for example, utilize APIs available within SaaS, web, home-grown applications, or other applications found in application 115. Microapp service 120 enables users to see content without needing to fully launch each application or switching windows. Absent the microapp service 120, users would need to launch an application, navigate to the action they need to perform, and then perform the action. The microapp service 120 may streamline routine tasks for frequently performed actions and provide users the ability to perform actions within the user application 165 without having to launch the native application.

The microapp service 120 may aggregate notifications to provide users a dynamic productivity tool through the first client device 160a, the second client device 160b, and the third client device 160c. The microapp service 120 may be configured within the cloud service 105, enabling administrators to create more productive workflows without the need for additional infrastructure. The microapp service 120 may streamline routine tasks for frequently performed actions, and may provide users the ability to perform actions within their workspace without having to launch the native application.

The microapp service 120 may be a single-tenant service for the first client device 160a, the second client device 160b, and the third client device 160c. The microapp service 120 may periodically pull active data from the application 115. Additionally, and/or alternatively, the microapp service 120 may detect data changes in SaaS apps and generate notifications. The microapp service 120 may send notifications pulled from the application 115 to the analytics service 130. The microapp service 120 may store the received applications systems data in a data cache service and send notifications to the analytics service 130. The microapp service 120 may also write back to the applications systems 115, for example, using OAuth2 or a service account.

The microapp service 120 may cause a message to be sent to the application 115 as directed by the first client device 160a, the second client device 160b, or the third client device 160c. The microapp service 120 may notify the first client device 160a, the second client device 160b, and the third client device 160c that the action was successfully completed.

The analytics service 130 may process the notifications received by the microapp service 120 to create notification relevance scores. The notification relevance score may be determined based on presenting the notification to a first client device and receiving a user response to the notification from the first client device. The notification relevance score may be determined based on at least the metadata characterizing the notification and at least metadata characterizing a user of the first client device 160a, the second client device 160b, and/or the third client device 160c. The analytics service 130 may prioritize the notification for users based on the notification relevance score. Other modules in the notification management service 110 may prioritize the notification for the users based on the notification relevance score.

The analytics service 130 may examine the metadata of the notifications to determine the notification relevance scores. In some embodiments, the analytics service 130 may analyze the metadata characterizing the notifications to determine the relevance of the notification. The metadata may include an urgency indicator of the notification, a source of the notification, a time of the notification, a title of the notification, a purpose of the notification, and/or an indication in the notification that the response is required. In some embodiments, the analytics service 130 may analyze the metadata characterizing the user of the first client device 160a, the second client device 160b, and/or the third client device 160c to determine the relevance of the notification to a user. The metadata may include a quantity of received notifications over time, a user availability, peer activity, a role, an organization, user activity, and/or a quantity of sent notifications over time.

The analytics service 130 may utilize other user metadata, such as availability, role (e.g., position), title, level of authority, status, industry group, background, education, and years of experience to determine the notification relevance score. The analytics service 130 may examine data from the first client device 160a, the second client device 160b, or the third client device 160c to determine the user likelihood of a user response. User responses include responding to the interaction, completing a task in response to the interaction, reading a message, sharing a post, and interacting with the notification. For example, a first employee may respond to an earnings call notification by clicking on the link in the notification or marking the notification as read. The analytics service 130 may examine metadata of the user application 165 (e.g., preference for financial news) to determine the likelihood of user responses from a group of users.

The analytics service 130 may select the notifications that are the most relevant to the user among a large set of notifications that are issued on behalf of the first client device 160a, the second client device 160b, and/or the third client device 160c. The analytics service 130 may determine a relevance scoring for the notification. The relevance scoring for the notification may ensure that the first client device 160a, the second client device 160b, or the third client device 160c is presented with notifications of highest priority first. The notifications may be prioritized based on a user organization, role, or peer activity. The notifications may be prioritized based on user activity.

The analytics service 130 may include a machine learning model 135. The machine learning model 135 may be configured to generate a value for the notification relevance score. The notification relevance score may be based on the machine learning model 135. The machine learning model 135 may be trained based on receiving a user response to the notification. The machine learning model 135 may be any type of machine learning model including, for example, a neural network, a convolutional neural network, a Markov chain, a support vector machine, a Bayesian network, a weighted scoring model, a heuristic model, linear regression, decision tree, logistic regression, and/or the like.

In some embodiments, the machine learning model 135 may be a type of deep learning network, including computational units (neurons) organized into layers that are applied sequentially to process data. For example, a neural network's neuron may be a simple computational unit. The neuron takes a set of inputs and generates an output based on an activation function. In some embodiments, the neuron combines all of its inputs and applies an application function to it and generates a single output. In some embodiments, one or more layers of the neural network are convolutional filters.

In some embodiments, the machine learning model 135 learns by weighing various factors of metadata. Each weight assigned to a factor may be determinative of the overall relevance score. Factors may include a type of application, a type of notification, and a third-party promotion of the notification.

The machine learning model 135 may be trained through training data such as positive user responses to notifications and negative user responses to notifications. For example, the machine learning model 135 may cause a new relevance score to be calculated in response to a first employee clicking on the link of the earnings call report. This training may perform an iterative optimization for selecting weights that maximize the ability of the machine learning model 135 to draw a positive user response.

In some embodiments, the machine learning model 135 may be trained using a database of known positive user responses and known negative user responses. A positive reaction may include responding to the interaction, completing a task in response to the interaction, reading a message, sharing a post, and interacting with the notification. A negative reaction may include ignoring a notification, disliking the notification, or deleting the notification. In some embodiments, a notification relevance decreases if no responses are received, the notification is disliked, or the notification is deleted.

After training, the machine learning model 135 may be applied to newly received notifications received to determine the likelihood of drawing a positive user reaction. In some embodiments, the machine learning model 135 may produce a quantitative value ranging from, for example, 0.0 (indicating very low likelihood of positive user reaction) to 1.0 (indicating very high likelihood of positive user reaction).

The machine learning model 135 may be trained based on at least the metadata characterizing the notification, the metadata characterizing the first user, and the metadata characterizing the second user, rather than data content of the notification. For example, the machine learning model 135 may place more weight on an urgency indicator of the notification, a source of the notification, a time of the notification, a title of the notification, and/or a purpose of the notification to determine the relevance score.

The notification service 140 receives notifications received from the analytics service 130 for processing and delivery to the client interface service 150. Notifications from the analytics service 130 may include a notification relevance score. In some implementations, the notification service 140 may store the notifications in a database to be later served in a notification feed. In some embodiments, the notification service 440 may send the notifications as a notification out immediately to the first client device 160a, the second client device 160b, and the third client device 160c via the client interface service 150. In some embodiments, the notification service 140 is configured to prioritize the notifications for presentation on a resource activity feed. The notification service 140 may determine whether the notification relevance score satisfies a threshold. The notification service 140 may determine the notification is to be presented to a second client device or a second group of people based on an updated notification relevance score.

The client interface service 150 may be configured to present processed notifications to the first client device 160a, the second client device 160b, and the third client device 160c, and the like. The client interface service 150 may be configured to send a user response to the microapp service 120 as received from the first client device 160a, the second client device 160b, and the third client device 160c. The first client device 160a, the second client device 160b, and the third client device 160c may use user application 165 to communicate with the client interface service 150. The client interface service 150 may be configured to present content on the first client device 160a, the second client device 160b, and the third client device 160c enabling access to the resource feed, the notifications, and/or the microapp service 120.

The first client device 160a, the second client device 160b, and the third client device 160c are configured to receive data from the client interface service 150. The first client device 160a, the second client device 160b, and the third client device 160c are configured to receive the notifications generated by the notification service 140. The first client device 160a, the second client device 160b, and the third client device 160c may receive data directly from the microapp service 120 (via the client interface service 150). The first client device 160a, the second client device 160b, and the third client device 160c may transmit data directly to the microapp service 120. The first client device 160a, the second client device 160b, and the third client device 160c are configured to run a user application 165. The first client device 160a, the second client device 160b, and the third client device 160c may be associated with a first user, a second user, and a third user, respectively. In some embodiments, the first user is associated with a first user group, the second user is associated with a second user group, and a third user is associated with a third user group. The first client device 160a, the second client device 160b, and the third client device 160c may be any type of computing device, including mobile devices.

The user application 165 may be accessed and/or presented via the first client device 160a, the second client device 160b, and the third client device 160c. The user application may be installed on the first client device 160a, the second client device 160b, and the third client device 160c, or may be executed by the client interface service 150 and accessed using a web browser.

The user application 165 and associated components may provide the first client device 160a, the second client device 160b, and the third client device 160c with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the user application 165 is launched or otherwise accessed by the first client device 160a, the second client device 160b, and the third client device 160c, the client interface service 150 may send a sign-on request to the application 115 via the microapp service 120, enabling notifications from the application 115 to be received by the microapp service 120.

The user application 165 may be configured to present a resource feed through the first client device 160a, the second client device 160b, and the third client device 160c. The resource feed service may aggregate all notifications from the different microapps and/or application 115 and present them to the first client device 160a, the second client device 160b, and the third client device 160c. The first client device 160a, the second client device 160b, and the third client device 160c may have access to a streamlined feed of notifications that may be taken with respect to events that are automatically detected by the microapp service 120. This resource feed, which may be customized for each client device 160, may allow users to monitor important activity on the application 115 without needing to switch context from one resource to another.

Notifications in a resource feed may be accompanied by a discrete set of user-interface elements, e.g., "approve," "deny," and "see more detail" buttons, allowing a user to take one or more simple actions with respect to each notification right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems (e.g., request personal time off, submit a help desk ticket, etc.) quickly and easily, increasing user productivity.

The user application 165 may present a list of available resources through the first client device 160a, the second client device 160b, and the third client device 160c. The user applications presents the prioritized notifications through a user interface to a user at the first client device 160a, the second client device 160b, and the third client device 160c. The available resources may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet-enabled devices or sensors, one or more local applications and/or one or more SaaS applications to which the first client device 160a, the second client device 160b, and the third client device 160c has subscribed. The first client device 160a, the second client device 160b, and the third client device 160c may invoke an action from the microapp service 120, causing the user application 165 to send that action to the microapp service 120 (via the client interface service 150).

Figure 2A:
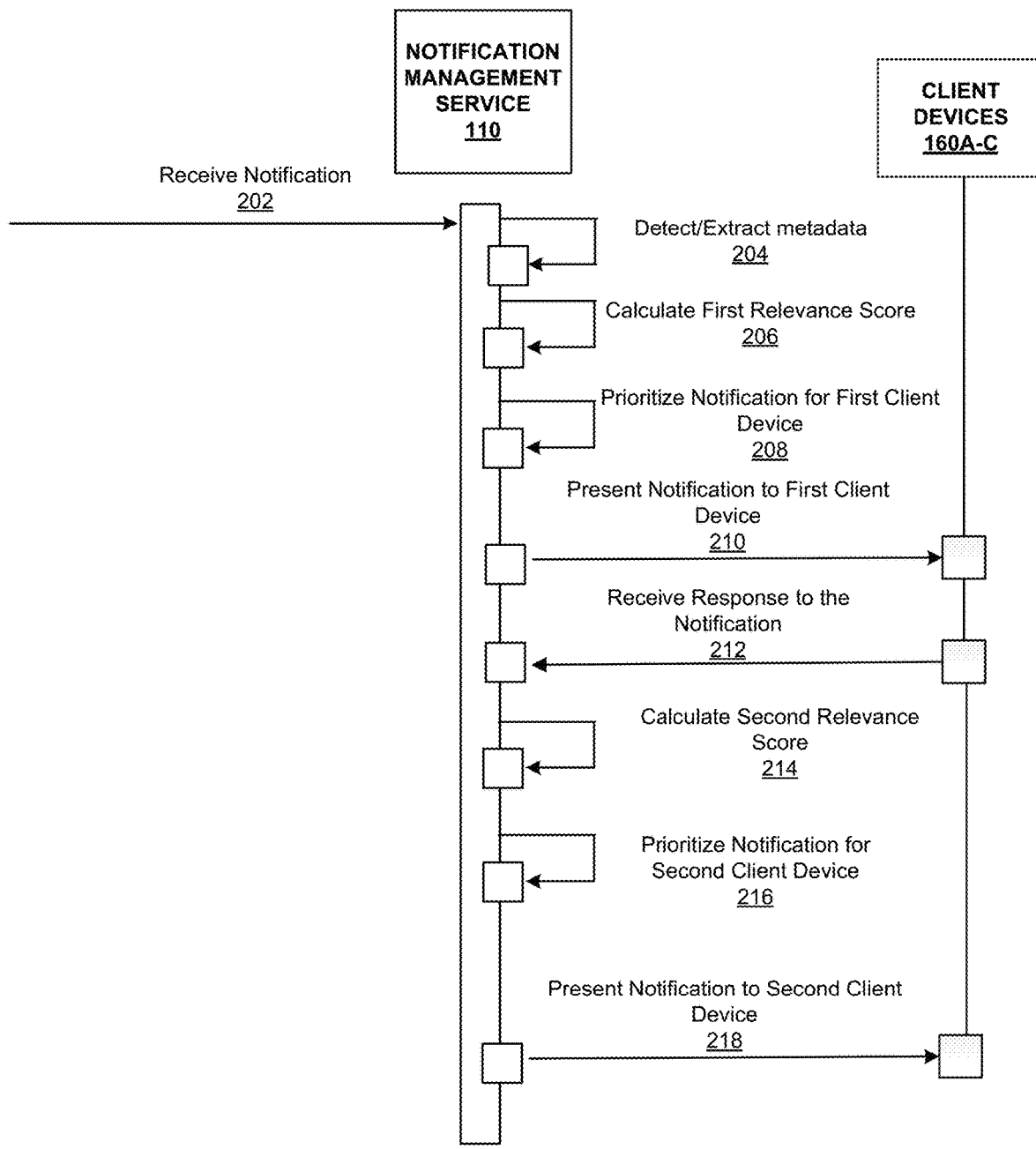
FIG. 2A depicts a process flow for presenting application content to a first client device and a second client device, in accordance with some example embodiments.

FIG. 2A depicts a flow process 200 for presenting application content to a first client device and a second client device, in accordance with some example embodiments.

At 202, the notification management service 110 receives a notification from the application 115. For example, a notification management service 110 may receive a notification, such as an earnings call notification from a financial reporting application and a classified ad notification from a classifieds application.

At 204, the analytics service 130 detects and/or extracts metadata characterizing the notification. For example, the notification management service 110 may extract metadata from the earnings call notification and the classified ad notification (e.g., the source of the notification, the time of the notification, the purpose of the notification, and the urgency of the notification).

At 206, the analytics service 130 calculates a first relevance score based on the metadata characterizing the notification. The first relevance score is indicative of a first relevance of the notification to a first user at a first client device. For example, the analytics service 130 determines a relevance of the earnings call for a first employee based on the user metadata (e.g., first employee role as an accountant) and a notification metadata (e.g., earnings call originated from the financial reporting application).

At 208, the analytics service 130 prioritizes the notification for the first user based on at least the first score. For example, the analyzer service 130 may prioritize the earnings call notification over the classified ad notification. In this example, the earnings call notification has a higher relevance to the financial clerks than a classified ad based on the user metadata (e.g., roles of financial clerks in earnings call) and notification metadata (e.g., earnings call originated from the financial reporting application).

At 210, a client interface service 150 presents the notification to the first client device. The order of notification presentation is based on at least the prioritization of the notification for the first user. Notifications for the first user may be presented in a first user application 165a at the first client device 160a. For example, the client interface service 150 enables the earnings call notification to be displayed on the first employee's computing device. The earnings call notification is prioritized over the classified ad notification because the earnings call notification has a higher score relative to the classified ad notification.

At 212, the client interface service 150 detects a first user response to the notification. For example, the client interface service 150 detects that the first employee selects a link in the earnings call notification.

At 214, the analytics service 130 calculates a second relevance score based on at least a response to the notification from the first client device. The second relevance score may be indicative of a second relevance of the notification to a second user at a second client device 160b. The second relevance score may also be indicative of a second relevance of the notification to a group of users at multiple client devices. For example, the analytics service 130 calculates a second relevance score based on the first employee selecting a link in the earnings call notification. The analytics service 130 makes the relevance score higher for a group of financial clerks based on the first employee selecting a link in the earnings call notification.

Additionally, and/or alternatively, the notification may be allowed to be presented at the second client device associated with the second user based on the updated notification relevance score exceeding a second threshold. The second threshold may be based on at least a predetermined quantity of positive responses and/or a predetermined percentage of positive responses.

At 216, the analytics service 130 prioritizes the notification for the second user based on at least the second score. For example, the analyzer service 130 may prioritize the earnings call notification over the classified ad notification for the second group (e.g., the financial clerks). In this example, the earnings call notification has higher relevance to the financial clerks than a classified ad based on the greater number of user responses to the earnings call notification.

At 218, a client interface service 150 presents the notification to the second client device 160b. The order of notification presentation is based on at least the prioritization of the notification for the second user. In some embodiments, the client interface service 150 presents the notification to a group of client devices associated with a group of users. The group of client devices may be more numerous than the first user group who initially received the notification. For example, the client interface service 150 enables the earnings call notification to be displayed on a group of client devices associated with financial clerks. The earnings call notification is prioritized over the classified ad notification because the earnings call notification has a higher score relative to the classified ad notification, especially for the group of client devices associated with the financial clerks.

Figure 2B:
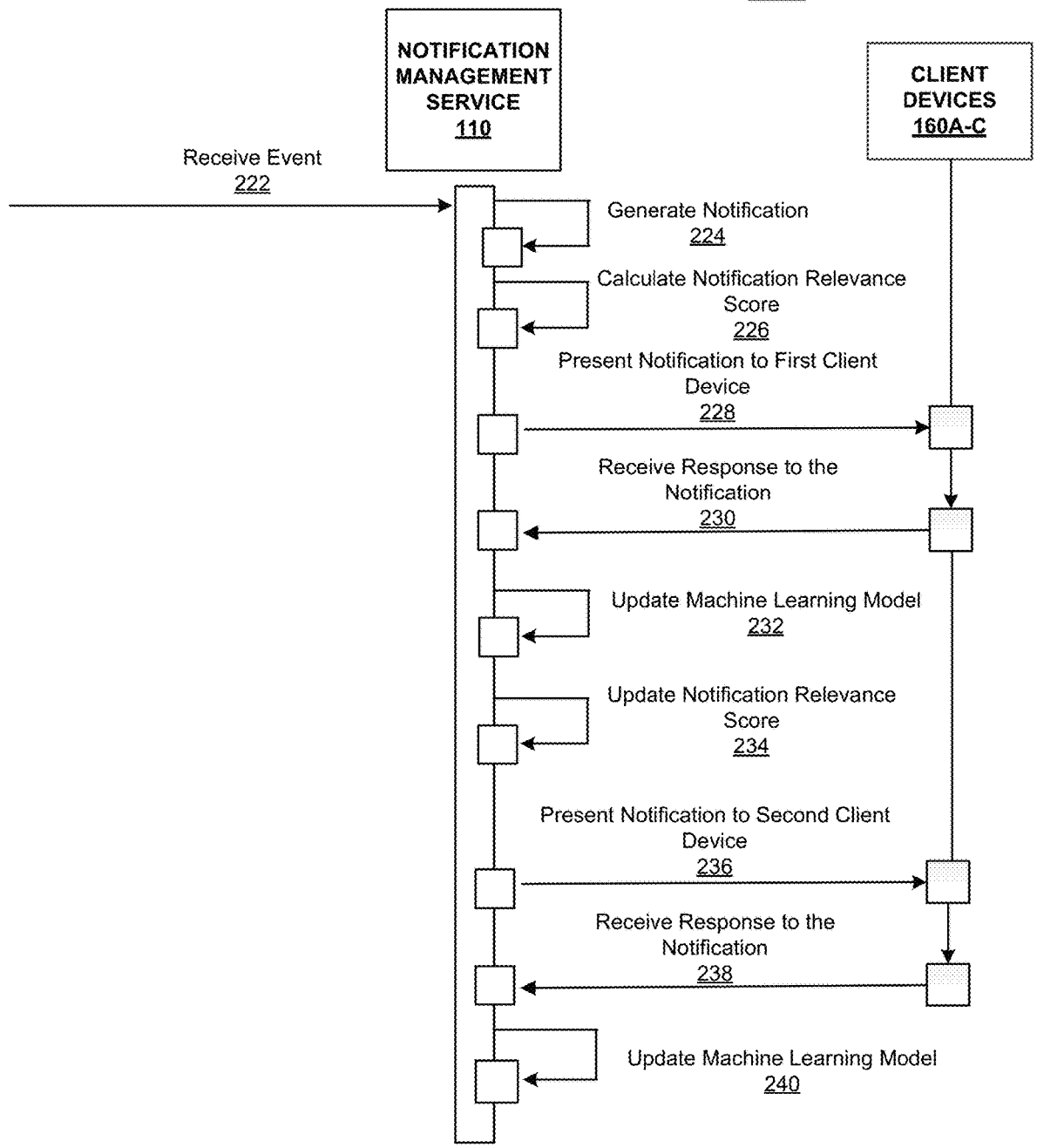
FIG. 2B depicts another process flow for presenting application content to a first client device and a second client device, in accordance with some example embodiments.

FIG. 2B depicts another flow process 299 for presenting application content to a first user and a second user, in accordance with some example embodiments. FIG. 2B is different from 2A in its focus on updating the machine learning model 135.

A notification relevance may be associated with any notification, such as earnings call notifications and classified ad notifications. Other types of notifications may include vacation request notifications, snow day notifications, office supplies notifications, and other types of messages.

At 222, the notification management service 110 receives an event or request from the application 115. For example, the notification management service 110 receives a request from an employee to take vacation time from a time management application.

At 224, the analytics service 130 detects that the event or request requires user notification and generates a notification based on the event or request from the application 115. For example, the notification management service 110 extracts metadata from the request (e.g., the source, the time, the purpose, the urgency) and determines the human resources supervisor is needed to fulfill the request. A notification for the human resources supervisor is generated based on the request.

At 226, the analytics service 130 calculates a notification relevance score based on the generated notification. The notification relevance score is indicative of whether a first user at a first client device is likely to respond to the notification. The notification relevance score may be determined based on at least a machine learning model 135. For example, the analytics service 130 determines a high relevance score based on the user metadata (e.g., human resources supervisor's role) and a notification metadata (e.g., notification origin).

At 228, a client interface service 150 presents the notification to a first client device associated with a first user. The first user may receive the first notification on a first client device 160a as presented in a first user application 165a. Additionally, and/or alternatively, the notification is enabled to be presented at the first client device associated with the first user based on the first score exceeding a first threshold. For example, the client interface service 150 enables the notification requesting vacation time to be displayed on the human resources supervisor's computing device. The notification requesting vacation time is prioritized over a notification regarding office supplies. This is because the vacation request notification has a higher score relative to the notification regarding office supplies.

At 230, the client interface service 150 detects a first user response to the notification as received by the first client device 160a. For example, the client interface service 150 detects that the human resources supervisor approved the request for vacation time.

At 232, the machine learning model 135 is trained based on the user response to the notification. For example, the machine learning model 135 is trained based on the human resources supervisor approving the request for vacation time.

At 234, the analytics service 130 calculates an updated notification relevance score based on the updated machine learning model 135. The updated notification relevance score is indicative of whether a second user at a second client device is likely to respond to the notification. In some embodiments, the updated notification is indicative of whether a second group of users is likely to respond to the notification, the second group of users being larger than the first. The updated notification relevance score may be determined based on at least the machine learning model 135. For example, machine learning model 135 determines a high relevance score for a group of supervisors based on at least the human resources supervisor approving the request for vacation time.

At 236, the notification may present the notification to a second client device associated with a second user based on the updated machine learning model 135. The notification may be presented to the second user based on the updated notification relevance score. For example, the client interface service 150 enables the notification requesting vacation time to be displayed on the department supervisors' computing devices because of the updated notification relevance score.

Additionally, and/or alternatively, the notification may be enabled to be presented at the second client device associated with the second user based on the updated notification relevance score exceeding a second threshold. The second threshold may be based on at least a predetermined quantity of positive responses and/or a predetermined percentage of positive responses.

At 238, the client interface service 150 detects a second user response to the notification as received by the second client device 160b. For example, the client interface service 150 detects that the department supervisors approved the request for vacation time.

At 240, the machine learning model 135 is further trained based on the second user response to the notification. For example, the machine learning model 135 is trained based on the department supervisors' approval of the request for vacation time.

Figure 3:
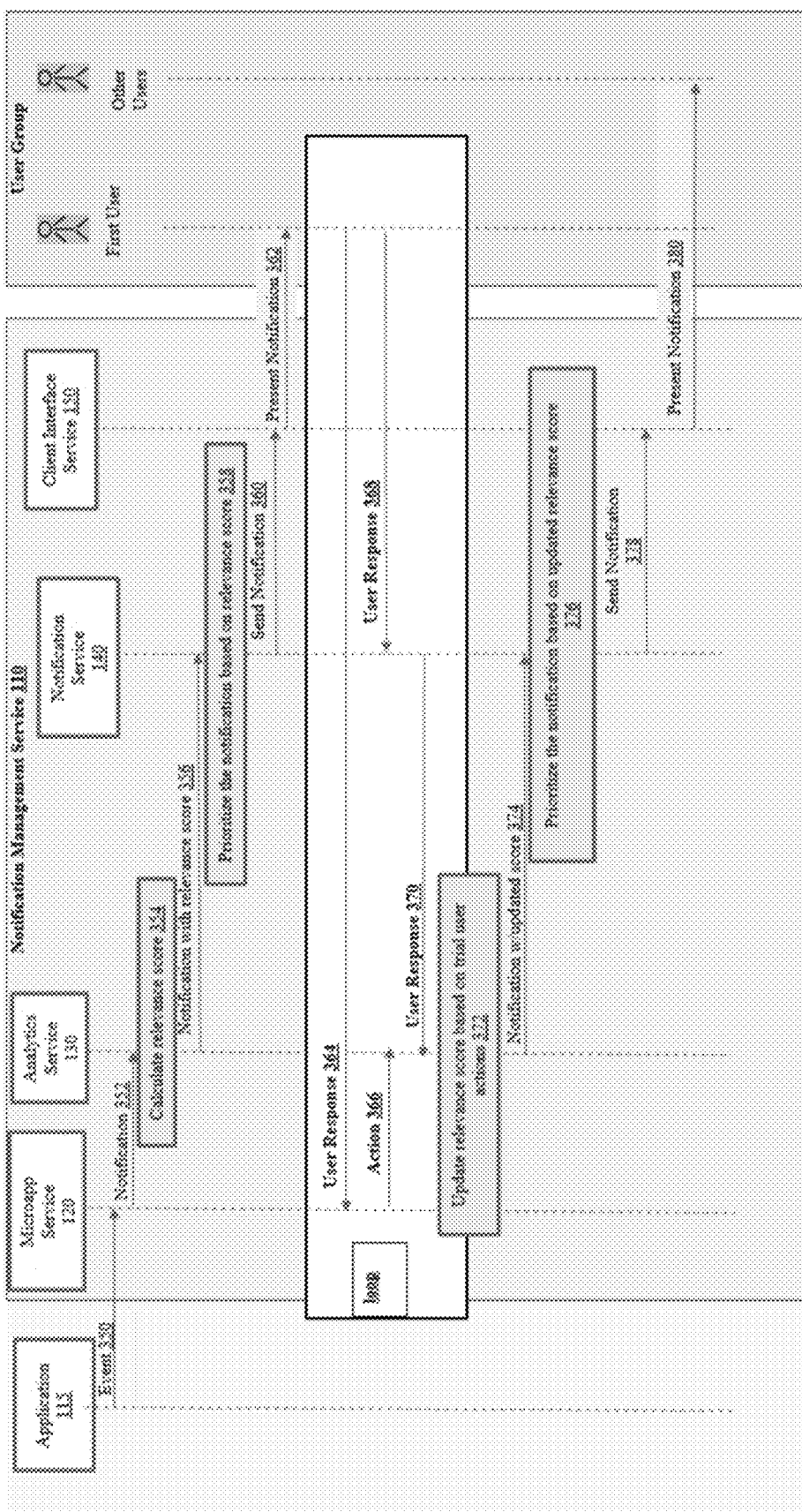
FIG. 3 depicts a sequence chart illustrating an example of a process for presenting application content to a first user and a second user, in accordance with some example embodiments.

FIG. 3 depicts a sequence chart 300 illustrating an example for a process for presenting application content to a first user and a second user, in accordance with some example embodiments.

At 350, the microapp service 120 receives an event from the application 115. For example, the microapp service 120 receives a request from an employee to take vacation time from a time management application.

At 352, the analytics service 130 detects that the event requires notification and generates a notification based on the event from the application 115. For example, the analytics service 130 determines the event requires the attention of the human resources supervisor. The analytics service 130 generates a notification regarding the requested vacation time based on the request.

At 354, the analytics service 130 calculates a notification relevance score based on the generated notification using a machine learning model 135. For example, the analytics service 130 determines a high relevance score based on the user metadata (i.e., human resources supervisor's role), notification metadata (i.e., notification origin), and the machine learning model 135.

At 356, the notification with the relevance score is sent to a notification service 140 from the analytics service 130.

At 358, the notification service 140 prioritizes the notification based on the relevance score. For example, the notification service 140 prioritizes the notification over a notification regarding office supplies. In this example, the vacation request notification has a higher score relative to the notification regarding office supplies based on at least the user metadata and the notification metadata.

At 360, the notification is sent from the notification service 140 to the client interface service 150. For example, the vacation request notification is sent to the client interface service 150.

At 362, a client interface service 150 presents the notification to a first user. The first user may receive the first notification on a first client device 160a as presented in a user application 165. For example, the client interface service 150 allows the notification requesting vacation time to be displayed on the human resources supervisor's computing device.

At 364, the microapp service 120 receives a first user response to the notification as received by the first client device 160a. For example, the microapp service 120 detects that the human resources supervisor approved of the request for vacation time.

At 366, the microapp service 120 sends a memo to the analytics service 130 that an action was taken by the first user in response to the notification. In some embodiments, the notification service 140 or the client interface service 150 detects, at 368, a first user response to the notification as received by the first client device 160a. At 370, the notification service 140 sends a memo to the analytics service that an action was taken by the first user in response to the notification.

At 372, the machine learning model 135 is updated based on the user response to the notification by the analytics service 130. For example, the machine learning model 135 is trained based on the human resources supervisor approving the request for vacation time.

At 374, the notification with the relevance score is sent to a notification service 140 from the analytics service 130. For example, the vacation request notification with the relevance score is sent to the notification service 140.

At 376, the notification service 140 prioritizes the notification based on the updated relevance score. For example, the notification service 140 may prioritize the notification over a notification regarding office supplies based on at least the higher score due to the user responses.

At 378, the notification is sent from the notification service 140 to the client interface service 150. For example, the notification requesting vacation time is sent to the client interface service 150.

At 380, a client interface service 150 presents the notification to additional users. For example, the client interface service 150 enables the notification requesting vacation time to be displayed on the department supervisor's computing device.

FIG. 4 depicts a flowchart illustrating a process 400 for presenting application content, in accordance with some example embodiments. Process 400 may be performed by the notification management service 110.

At 402, a first score is determined, the first score indicative of a first relevance of the notification to a first user at a first client device. The first score is determined based on at least metadata characterizing the notification. For example, the notification management service 110 may detect notifications on the application 115 that are relevant to a user on the first client device 160a. The analytics service 130 may determine the first score utilizing metadata from the notification. For example, the analytics service 130 may utilize notification metadata, such as a source of the notification and a time of the notification. The analytics service 130 may utilize user metadata, such as user availability, a peer activity, and a user role.

At 404, the notification is prioritized for the first user based on at least the first score. For example, the analytics service 130 may determine the first score is higher compared to other notifications about duties involving office supplies, placing the notification ahead of other notifications for presentation to the first client device 160a. Alternatively, the analytics service 130 may determine the first score is relatively low to other notifications, placing the notification behind other notifications for presentation to the first client device 160a.

At 406, the notification is presented at the first client device based on at least the prioritization for the first user. For example, the client interface service 150 may push the notification to the first client device 160a.

At 408, a second score is determined, the second score indicative of a second relevance of the notification to a second user at a second client device. The second score is determined based on at least a response to the notification from the first client device. For example, the analytics service 130 may determine the second score based on at least a positive response (e.g., reading a message, approving a request, interacting with the notification, or sharing a post) received from the first client device 160*a*.

Figure 5A:
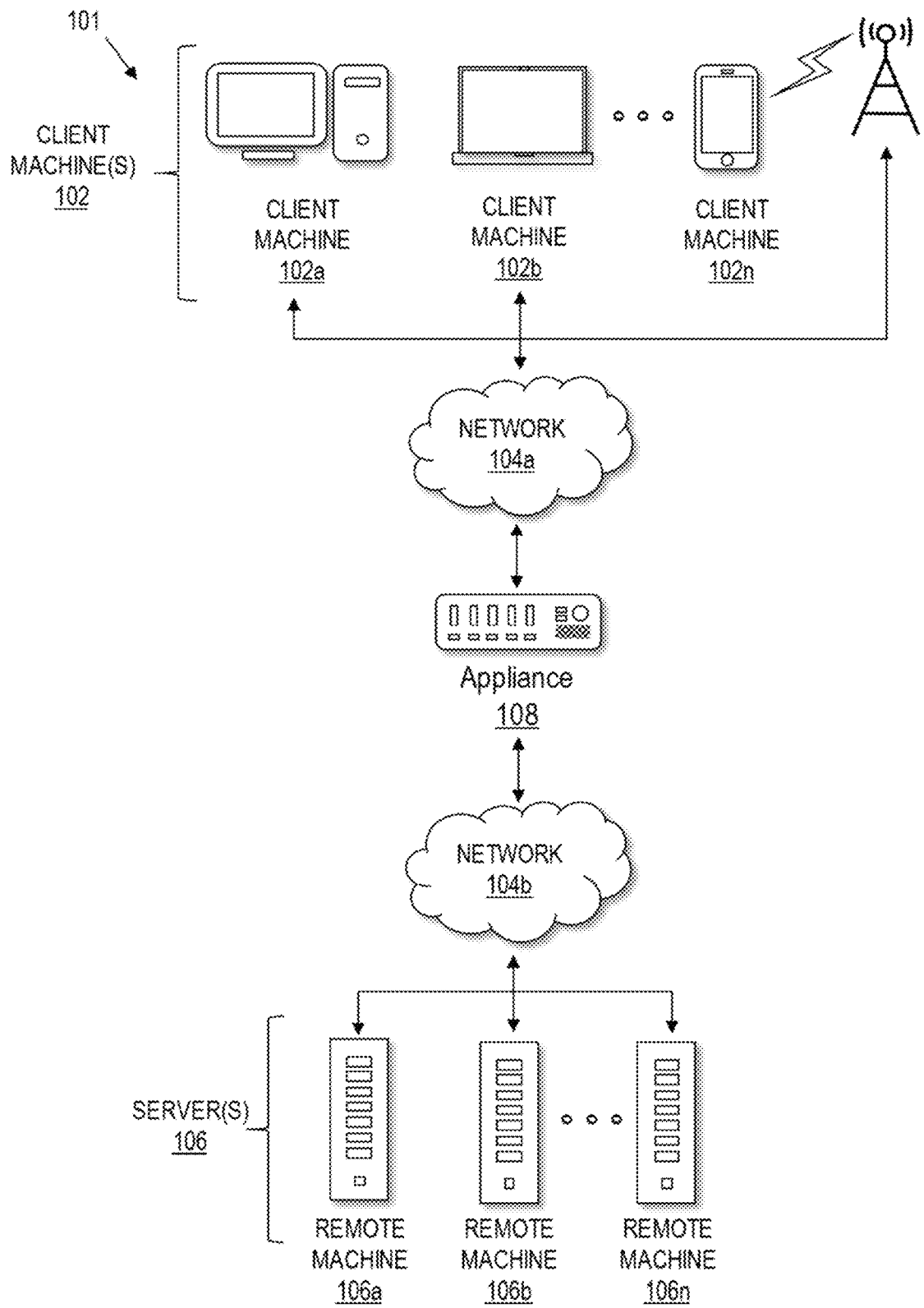
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 through 5A, the network environment 101 in which various aspects of the disclosure may be implemented may include one or more clients 102*a*-102*n*, one or more remote machines 106*a*-106*n*, one or more networks 104*a* and 104*b*, and one or more appliances 108 installed within the network environment 101. The clients 102*a*-102*n* communicate with the remote machines 106*a*-106*n* via the networks 104*a* and 104*b*.

In some example embodiments, the clients 102*a*-102*n* may communicate with the remote machines 106*a*-106*n* via an appliance 108. The illustrated appliance 108 is positioned between the networks 104*a* and 104*b*, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104*a* and/or 104*b*.

The clients 102*a*-102*n* may be generally referred to as client machines, local machines, clients, client nodes, client computers, client devices, computing devices, endpoints, or endpoint nodes. The clients 102*a*-102*n* may include, for example, the first client 110*a*, the second client 110*b*, and/or the like. The remote machines 106*a*-106*n* may be generally referred to as servers or a server farm. In some example embodiments, a client 102 may have the capacity to function as both a client node seeking access to resources provided by a server 106 and as a server 106 providing access to hosted resources for other clients 102*a*-102*n*. The networks 104*a* and 104*b* may be generally referred to as a network 104. The network 104 including the networks 104*a* and 104*b* may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 102.

In yet other example embodiments, a server 106 may execute a virtual machine providing, to a user of a client 102, access to a computing environment. The client 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
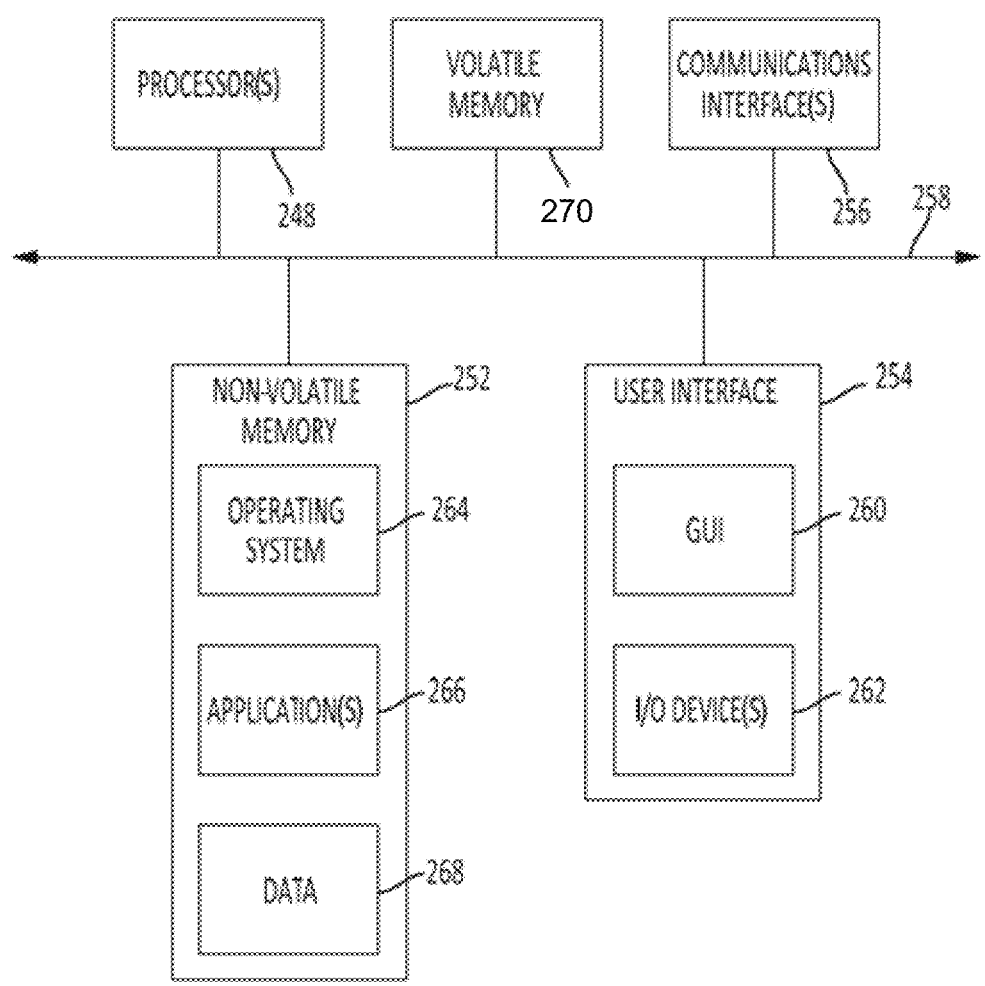
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 through 5A-B, the computing device 500 may be useful for practicing an embodiment of the clients 102, the servers 106, and/or the appliances 108.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The nonvolatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the bus 258. The computing device 500 as shown in FIG. 5B is shown merely as an example, as the clients 102, the servers 106, and the appliances 108 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 102), may execute a virtual machine, which provides an execution session within which applications execute on behalf of a user or a client computing device (e.g., the clients 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
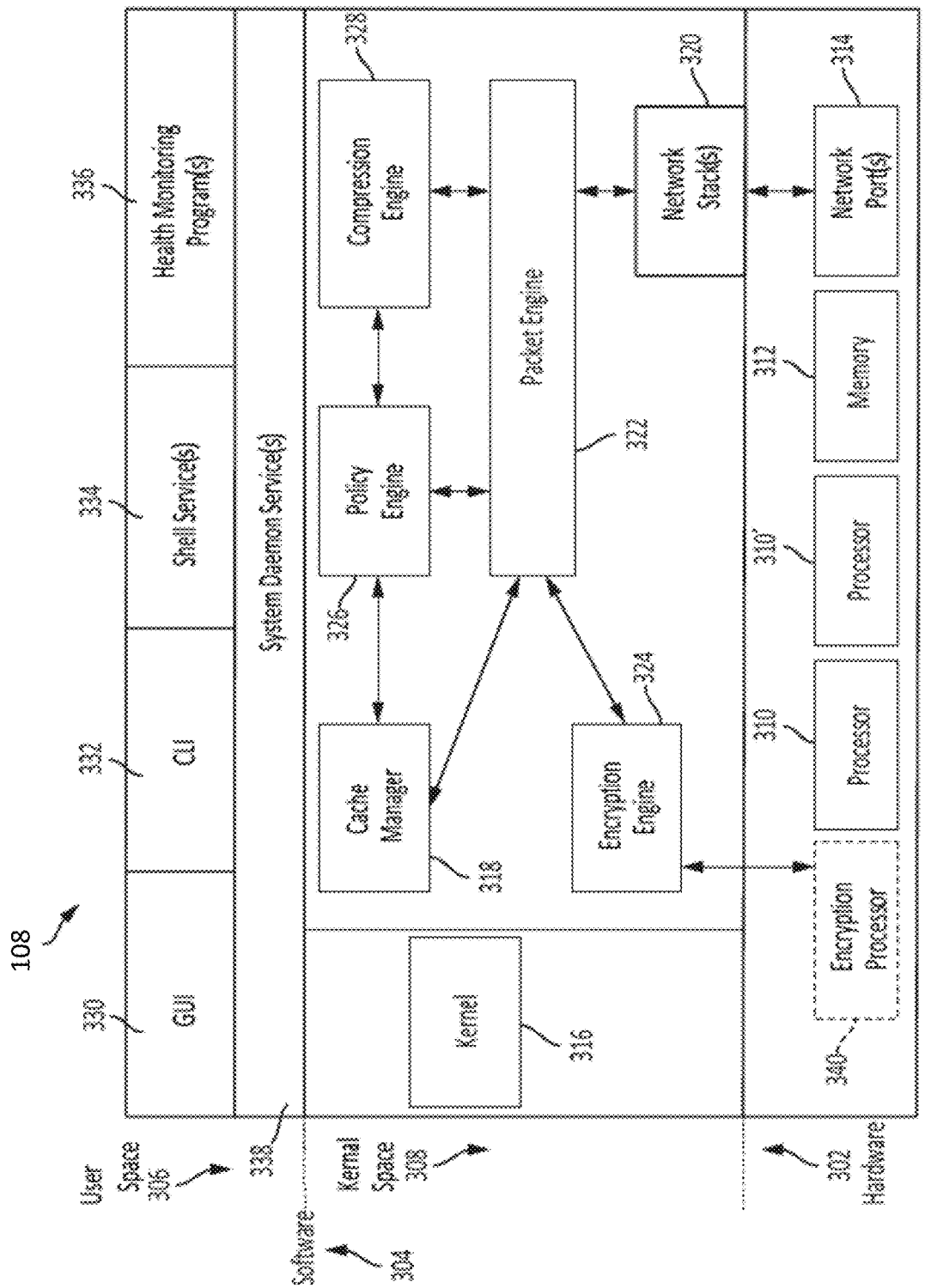
FIG. 5C depicts a block diagram illustrating an example of a network appliance, in accordance with some example embodiments.

FIG. 5C depicts a block diagram illustrating an example of the network appliance 108, in accordance with some example embodiments. The appliance 108 may be implemented as a server, gateway, router, switch, bridge or other type of computing or network device. As shown in FIG. 5C, in some example embodiments, the appliance 108 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 108. As shown, the hardware layer 302 may include one or more processing units 310 for executing software programs and services, memory 312 for storing software and data, one or more network ports 314 for transmitting and receiving data over one or more networks 104, and an encryption processor 340 for encrypting and decrypting data such as in relation to Secure Socket Layer (SSL) or Transport Layer Security (TLS) processing of data transmitted and received over one or more networks 104.

An operating system (not shown in FIG. 5C) of the appliance 108 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 108. The kernel space 308 may also include a number of network services or processes working in conjunction with a cache manager 318.

The appliance 108 may include one or more network stacks 320, such as a TCP/IP based stack, for communicating with the client(s) 102, server(s) 106, network(s) 104a and 104b, and/or other appliances 108. For example, the appliance 108 may establish and/or terminate one or more transport layer connections between the client(s) 102 and the server(s) 106. Each network stack 320 may include a buffer for queuing one or more network packets for transmission by the appliance 108.

The kernel space 308 may include the cache manager 318, a packet engine 322, an encryption engine 324, a policy engine 326, and a compression engine 328. One or more of the processes may thus run in the core address space of the operating system of the appliance 108, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some example embodiments, the cache memory may be a data object in the memory 312 of the appliance 108, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 108, and define or configure security, network traffic, network access, compression or other functions performed by the appliance 108.

The encryption engine 324 may process any security related protocol, such as SSL or TLS. For example, the encryption engine 324 may encrypt and decrypt network packets, or any portion thereof, communicated via the appliance 108, may setup or establish SSL, TLS or other secure connections, for example, between the client(s) 102, the server(s) 106, and/or one or more other appliances 108. In some example embodiments, the encryption engine 324 may use a tunneling protocol to provide a virtual private network (VPN) between a client 102 and a server 106. For example, in some example embodiments, the encryption engine 324 may be in communication with the encryption processor 340. The compression engine 328 may compress network packets bi-directionally between the client(s) 102 and the server(s) 106 and/or between one or more of the appliances 108.

The packet engine 322 may manage kernel-level processing of packets received and transmitted by the appliance 108 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel 316 directly and may instead use service calls in order to access kernel services. As shown in FIG. 5C, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 108, such as via the operating system of the appliance 108. The shell service(s) 334 may, for example, include programs, services, tasks, processes, and/or executable instructions to support interaction with the appliance 108 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 108. In some example embodiments, the health monitoring program(s) 336 may intercept and inspect any network traffic passed via the appliance 108. For example, the health monitor program 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 108. Further, the health monitoring program(s) 336 may determine if a program, process, service and/or task is active and currently running, check status, error, and/or history logs provided by any program, process, service and/or task to determine any condition, status and/or error with any portion of the appliance 108. Additionally, the health monitoring program(s) 336 may measure and monitor the performance of any application, program, process, service, task, and/or thread executing on the appliance 108.

The daemon service(s) 338 are programs that run continuously or in the background and handle periodic service requests received by the appliance 108. In some example embodiments, a daemon service 338 may, for example, forward such requests to other programs and/or processes, such as another daemon service 338, as appropriate.

The appliance 108 may relieve the server(s) 106 of much of the processing load caused by repeatedly opening and closing transport layer connections to the client(s) 102 by opening one or more transport layer connections with each server 106 and maintaining these connections to allow repeated data access by the client(s) 102 via the Internet (e.g., "connection pooling"). To perform connection pooling, the appliance 108 may translate or multiplex communications by modifying sequence numbers and acknowledgment numbers at the transport layer protocol level (e.g., "connection multiplexing"). The appliance 108 may also provide switching and/or load balancing for communications between the client(s) 102 and the server(s) 106.

Figure 6:
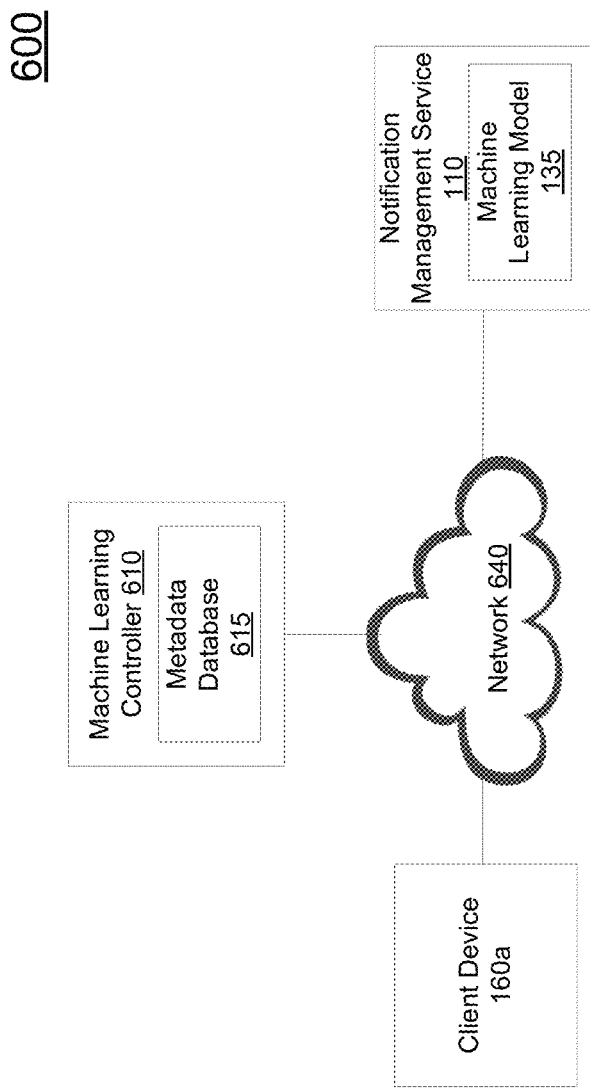
FIG. 6 depicts a system diagram illustrating an example of a machine learning processing system, in accordance with some example embodiments.

FIG. 6 depicts a system diagram illustrating an example of a machine learning processing system 600, in accordance with some example embodiments. The machine learning model 135 may be trained in a manner similar to a machine learning processing system 600. The machine learning model 135 may communicate with devices over a network similar to or as depicted in the machine learning processing system 600. Referring to FIG. 6, the machine learning processing system 600 may include a machine learning controller 610, a notification management service 110, and a first client device 160a. The machine learning controller 610, the notification management service 110, and the first client device 160a may be communicatively coupled via a network 640. It should be appreciated that the first client device 160a may be any processor-based device including, for example, a smartphone, a tablet computer, a wearable apparatus, a virtual assistant, an Internet-of-Things (IoT) appliance, and/or the like. The network 640 may be any wired network and/or a wireless network including, for example, a wide area network, a local area network, a virtual local area network, a public land mobile network, the Internet, and/or the like.

In some example embodiments, the machine learning controller 610 may be configured to generate a metadata database 615 for training and validating the machine learning model 135 to perform notification processing including classification of a notification received from the first client device 160a. The machine learning model 135 may utilize any type of machine learning, including, for example, a neural network, a convolutional neural network, a Markov chain, a support vector machine, a Bayesian network, and/or the like. The metadata database 615 may include a training dataset for training the machine learning model 135 as well as a validation dataset for validating the performance of the machine learning model 135.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   determining, for a notification, a first score indicative of a first relevance of the notification to a first user at a first client device, the first score determined based on at least metadata characterizing the notification;
   prioritizing the notification for the first user based on at least the first score;
   presenting, based on at least the prioritization for the first user, the notification at the first client device; and
   determining, for the notification, a second score indicative of a second relevance of the notification to a second user at a second client device, the second score determined based on at least a response to the notification from the first client device.

2. The system of claim 1 further comprising:
   prioritizing the notification for the second user based on at least the second score; and
   presenting, based on at least the prioritization for the second user, the notification at the second client device.

3. The system of claim 1, wherein the first user is associated with a first user group, and wherein the second user is associated with a second user group.

4. The system of claim 1, wherein the determining the second score is based on at least a machine learning model, the machine learning model trained in response to receiving the response to the notification.

5. The system of claim 4, wherein the second score is a value generated by the machine learning model.

6. The system of claim 4, wherein the machine learning model is further trained based on at least the metadata characterizing the notification, the metadata characterizing the first user, and the metadata characterizing the second user, rather than data content of the notification.

7. The system of claim 4, wherein the machine learning model comprises a weighted scoring model, a heuristic model, linear regression, decision tree, logistic regression, and/or a neural network.

8. The system of claim 1, wherein the second score is determined based on at least the metadata characterizing the notification and at least metadata characterizing the second user.

9. The system of claim 8, wherein the metadata characterizing the notification includes an urgency indicator of the notification, a source of the notification, a time of the notification, a title of the notification, a purpose of the notification, and/or an indication in the notification that the response is required.

10. The system of claim 8, wherein the metadata characterizing the first user includes a quantity of received notifications over time, a user availability, peer activity, a role, an organization, user activity, and/or a quantity of sent notifications over time.

11. A method comprising:
    determining, for a notification, a first score indicative of a first relevance of the notification to a first user at a first client device, the first score determined based on at least metadata characterizing the notification;
    prioritizing the notification for the first user based on at least the first score;
    presenting, based on at least the prioritization for the first user, the notification at the first client device; and
    determining, for the notification, a second score indicative of a second relevance of the notification to a second user at a second client device, the second score determined based on at least a response to the notification from the first client device.

12. The method of claim 11 further comprising:
    prioritizing the notification for the second user based on at least the second score; and
    presenting, based on at least the prioritization for the second user, the notification at the second client device.

13. The method of claim 11, wherein the first user is associated with a first user group, and wherein the second user is associated with a second user group.

14. The method of claim 11, wherein the determining the second score is based on at least a machine learning model, the machine learning model trained in response to receiving the response to the notification.

15. The method of claim 14, wherein the second score is a value generated by the machine learning model.

16. The method of claim 14, wherein the machine learning model is further trained based on at least the metadata characterizing the notification, the metadata characterizing the first user, and the metadata characterizing the second user, rather than data content of the notification.

17. The method of claim 14, wherein the machine learning model comprises a weighted scoring model, a heuristic model, linear regression, decision tree, logistic regression, and/or a neural network.

18. The method of claim 11, wherein the second score is determined based on at least the metadata characterizing the notification and at least metadata characterizing the second user.

19. The method of claim 18, wherein the metadata characterizing the notification includes an urgency indicator of the notification, a source of the notification, a time of the notification, a title of the notification, a purpose of the notification, and/or an indication in the notification that the response is required.

* * * * *